United States Patent
Lee et al.

(10) Patent No.: US 9,823,405 B2
(45) Date of Patent: Nov. 21, 2017

(54) DISPLAY APPARATUS

(71) Applicant: Samsung Display Co., Ltd., Yongin, Gyeonggi-Do (KR)

(72) Inventors: Donghyeon Lee, Seoul (KR); Seung Hwan Baek, Seoul (KR); Luly Lee, Yongin-si (KR); Yeongbae Lee, Suwon-si (KR)

(73) Assignee: Samsung Display Co., Ltd. (KR)

(*) Notice: Subject to any disclaimer, the term of this patent is extended or adjusted under 35 U.S.C. 154(b) by 116 days.

(21) Appl. No.: 14/727,048

(22) Filed: Jun. 1, 2015

(65) Prior Publication Data

US 2016/0187563 A1 Jun. 30, 2016

(30) Foreign Application Priority Data

Dec. 26, 2014 (KR) ........................ 10-2014-0190592

(51) Int. Cl.
*F21V 8/00* (2006.01)

(52) U.S. Cl.
CPC ......... *G02B 6/0023* (2013.01); *G02B 6/0066* (2013.01); *G02B 6/0091* (2013.01); *G02B 6/0026* (2013.01)

(58) Field of Classification Search
CPC .. G02B 6/0023; G02B 6/0026; G02B 6/0066; G02B 6/0068; G02B 6/0073; G02B 6/009; G02B 6/0091
See application file for complete search history.

(56) References Cited

U.S. PATENT DOCUMENTS

| 8,294,168 | B2 | 10/2012 | Park et al. | |
|---|---|---|---|---|
| 8,757,862 | B2* | 6/2014 | Lee | F21S 8/00 349/58 |
| 9,074,748 | B2* | 7/2015 | Yang | G02B 6/42 |
| 9,110,204 | B2* | 8/2015 | Nakamura | G02B 6/0026 |
| 9,429,701 | B2* | 8/2016 | Lee | G02B 6/0073 |
| 2013/0050612 | A1 | 2/2013 | Hur et al. | |
| 2013/0050616 | A1* | 2/2013 | Seo | G02F 1/133603 349/71 |
| 2013/0277643 | A1 | 10/2013 | Williamson et al. | |
| 2014/0240644 | A1* | 8/2014 | Abe | G02B 6/0088 349/71 |
| 2015/0338064 | A1* | 11/2015 | Ishino | G02F 1/133615 349/61 |
| 2015/0355400 | A1* | 12/2015 | Li | G02B 6/0026 349/62 |

FOREIGN PATENT DOCUMENTS

| KR | 10-2012-0061538 A | 6/2012 |
|---|---|---|
| KR | 10-2012-0068499 A | 6/2012 |
| KR | 10-2013-0069247 A | 6/2013 |

\* cited by examiner

*Primary Examiner* — Alan Cariaso
(74) *Attorney, Agent, or Firm* — Innovation Counsel LLP

(57) ABSTRACT

A display apparatus includes a display panel displaying an image using light; a light source generating first light; a light conversion member converting the first light into the light; a case member accommodating the light source and the light conversion member and including an open part to transmit the light which is converted by the light conversion member; and a light guide plate receiving the light through the open part and guiding the light to a upward direction where the display panel is disposed.

18 Claims, 5 Drawing Sheets

DISPLAY APPARATUS

CROSS-REFERENCE TO RELATED APPLICATIONS

A claim for priority under 35 U.S.C. §119 is made to Korean Patent Application No. 10-2014-0190592 filed Dec. 26, 2014, in the Korean Intellectual Property Office, the entire contents of which are hereby incorporated by reference.

FIELD OF THE INVENTION

A display apparatus, and more particularly, a display apparatus capable of facilitating a combination with a light source and a light conversion member and preventing leakage of blue light, are provided.

BACKGROUND

Among display apparatuses, a liquid crystal display apparatus generally includes a display panel having a plurality of pixels to generate an image, and a backlight unit supplying light to the display panel. The pixels of the display panel adjust transmittance of light, which is supplied from the backlight unit, in displaying an image.

In recent years, light conversion members that include quantum dots have been employed to improve the efficiency of light that is supplied to a display panel. A light conversion member may be shaped in a bar and used in an edge-type backlight unit. A light conversion member is capable of transforming light, which has a predetermined color provided from a light source, into white light. For instance, a light conversion member may convert blue light, which is provided from a light source, into white light.

White light generated by such a light conversion member may be supplied to a display panel, and then pixels of the display panel may display an image using the white light that is supplied from the light conversion member.

SUMMARY

One aspect of embodiments of the inventive concept is directed to provide a display apparatus capable of facilitating a combination with a light source and a light conversion member and preventing leakage of blue light.

A display apparatus may include: a display panel configured to display an image using light; a light source configured to generate first light; a light conversion member configured to convert the first light into the light; a case member configured to accommodate the light source and the light conversion member and including an open part to transmit the light which is converted by the light conversion member; and a light guide plate configured to receive the light through the open part and guide the light toward an upward direction where the display panel is disposed.

The case member may block light, and the first light may be blue while the light may be white.

The light conversion member may be larger than the open part in area and overlaps with the open part.

The light source, the light conversion member and the case member may extend along a first direction, the light conversion member may be disposed between the light source and the case member in a second direction intersecting the first direction, and the case member may be disposed adjacent to a side of the light guide plate.

The case member may further include: a protrusion part protruding out to the side of the light guide plate at a front side of the case member facing the side of the light guide plate and having a shape of frame to surround the open part; a contact part, as a part of the front side of the case member, disposed between the protrusion part and the open part; and first and second grooves overlapping each other and having different sizes each other, the second groove inset from the first groove toward the front side of the case member from a back side which is the opposite of the front side in the case member. The first groove may be disposed adjacent to the open part, the second groove may be disposed adjacent to the back side of the case member, the first groove may be smaller than the second groove on a first plane formed in a third direction intersecting the first and second directions, and the open part may be smaller than the first groove.

The light conversion member may be inserted into the first groove and the light source may be inserted into the second groove.

A predetermined region of the side of the light guide plate may be inserted into the frame of the protrusion part.

The light conversion member may include: a quantum dot member configured to convert the first light into the light; and a quantum dot bar configured to accommodate the quantum dot member. An area of the quantum dot member facing the open part may be larger than or equal to an area of the open part on the first plane.

The first groove may be equal to the light conversion member in size on the first plane.

A depth of the first groove, being defined as a gap of height between bottoms of the first and second grooves in the second direction, may be larger than a thickness of the light conversion member in the second direction.

The light source may include: a substrate extending along the first direction; and a plurality of light source units arranged with a uniform interval in the first direction on the substrate and generating the first light. The substrate of the light source may be inserted into the second groove.

The second groove may be equal to the substrate of the light source in size on the first plane.

A depth of the second groove, being defined as a gap of height between a bottom of the second groove and the back side of the case member in the second direction, may be larger than or equal to a thickness of the substrate of the light source in the second direction.

A depth of the first groove, being defined as a gap of height between bottoms of the first and second grooves in the second direction, may be larger than a sum of thicknesses of the light conversion member and each of the light source units in the second direction.

A region formed by inner sides of the framed protrusion part may be equal to a side of the light guide plate in size on the first plane.

The frame of the protrusion may be larger than the open part on the first plane and the contact part may be disposed between the protrusion part and the open part in the first and third directions.

A display apparatus according to the inventive concept is useful in facilitating a combination with a light source and a light conversion member therein and preventing leakage of blue light.

DETAILED DESCRIPTION

Advantages and features of the inventive concept, and ways for accomplishing them will be apparent from embodiments described in detail hereinafter in conjunction with the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. The inventive concept may be properly defined in the scope of the annexed claims. Unless otherwise noted, the same reference numerals denote the same elements throughout the attached drawings.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. As used herein, the term "and/or" includes any and all combinations of one or more of the associated listed items.

Spatially relative terms, such as "beneath", "below", "lower", "under", "above", "upper" and the like, may be used herein for ease of description to explain one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" or "under" other elements or features would then be oriented "above" the other elements or features. Thus, the exemplary terms "below" and "under" can encompass both an orientation of above and below, depending on the orientation. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

The embodiments described in the specification will be illustrated with reference to idealized schematics, and plan and sectional views. Such illustrations may be modified depending on fabrication techniques and/or permissible variations. Accordingly, the embodiments of the inventive concept may not be construed as restrictive thereto, rather including other varieties, even allowable deviations or errors, arising from fabrication processes. Regions or areas exemplified in the drawings may have generic characters and exemplary patterns of the regions may be just provided for particular forms, not limitations to the scope of the inventive concept.

Now hereinafter will be described example embodiments of the inventive concept in conjunction with accompanying drawings.

Figure 1:
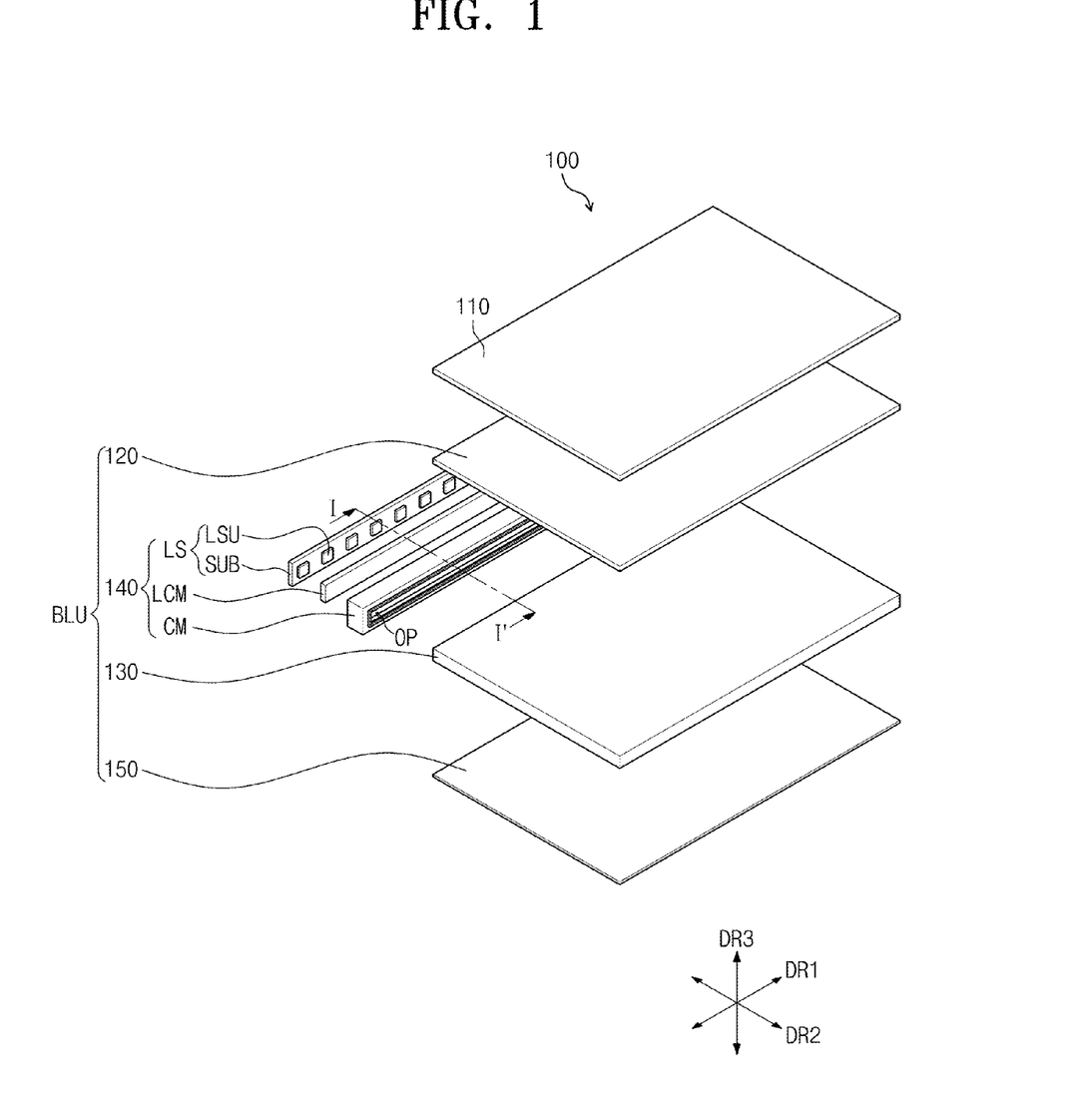
FIG. 1 is an exploded perspective view illustrating a display apparatus according to an embodiment of the inventive concept.

FIG. 1 is an exploded perspective view illustrating a display apparatus according to an embodiment of the inventive concept.

Referring to FIG. 1, the display apparatus 100 may include a display panel 110 to display an image using light, and a backlight unit BLU to generate and supply the light to the display panel 110. The backlight unit BLU may be disposed at the back of the display panel 110, supplying light to the display panel 110.

Although not shown, the display panel 110 may include a plurality of pixels to display an image using light. Additionally, the display panel 110 may be a kind of liquid crystal display panel including a liquid crystal layer. For example, the display panel 110 may include a first substrate in which a plurality of pixels are disposed, a second substrate facing the first substrate, and a liquid crystal layer disposed between the first and second substrates (not shown).

The backlight unit BLU may be a kind of edge-type backlight unit. The backlight unit BLU may include an optical sheet 120, a light guide plate 130, a light emission member 140, and a reflection sheet 150.

The display panel 110, the optical sheet 120, the light guide plate 130, the light emission member 140 and the reflection sheet 150 may have long sides in a first direction DR1 and short sides in a second direction DR2 intersecting the first direction DR1.

The light emission member 140 may be disposed adjacent to a side of the light guide plate 130 in the second direction DR2. The reflection sheet 150 may be disposed under the light guide plate 130 while the optical sheet 120 may be disposed on the light guide plate 130. The display panel 110 may be disposed on the optical sheet 120.

The light emission member 140 may generate light to be used for the display panel 110. Light generated from the light emission member 140 may be supplied to a side of the light guide plate 130 in the second direction DR2.

The light guide plate 130 may turn a propagating direction of the light that is supplied from the light emission member 140 toward the upward direction, where the display panel 110 is disposed. The reflection sheet 150 may reflect light, which is directed downward in the light guide plate 130, toward the upward direction.

The optical sheet 120 may include a spread sheet (not shown), and a prism sheet (not shown) disposed on the spread sheet. The spread sheet may act to diffuse light from the light guide plate 130.

The prism sheet may act to concentrate light, which is diffused in the spread sheet, to the upward direction that is vertical to the plane. Light passing through the prism sheet may be propagated upward and supplied to the display panel 110, having a uniform luminance distribution.

The light emission member 140 may include a light source LS, a light conversion member LCM, and a case member CM. The light source LS, the light conversion member LCM and the case member CM may extend along the first direction DR1. In detail, the light source LS, the light conversion member LCM and the case member CM may have long sides in the first direction DR1 and short sides in a third direction DR3 intersecting the first and second directions DR1 and DR2.

The light conversion member LCM may be disposed between the light source LS and the case member CM in the second direction DR2. In the second direction DR2, the case member CM may be disposed adjacent to a side of the light guide plate 130. In detail, an open part OP of the case member CM may be disposed adjacent to a side of the light guide plate 130 in the second direction DR2. The case member CM may block light.

The light source LS may include a substrate SUB extending along the first direction DR1, and a plurality of light source units LSU positioned on the substrate SUB. The light source units LSU may be arranged with a uniform interval between each light source unit in the first direction DR1. The light source units LSU may emit first light having a predetermined color. For instance, the light source units LSU may be a type of blue LED that emits blue light. That is, the first light may be blue light.

The light source LS and the light conversion member LCM may be accommodated in the case member CM. The light conversion member LCM may be first accommodated in the case member CM and next the light source LS may be accommodated in the case member CM. The light conversion member LCM may be disposed adjacent to the open part OP.

The light conversion member LCM may be overlapped with the open part OP of the case member CM, and the light conversion member LCM may be larger than the open part OP of the case member CM in area on a plane formed in the first and third directions DR1 and DR3. Detailed configuration of the case member CM will be described later in conjunction with FIGS. 2 to 4. Hereinafter, the plane formed in the first and third directions DR1 and DR3 will be referred to as "a first plane".

The first light emitted from the light source units LSU of the light emission member 140 may be supplied to the light conversion member LCM. The light conversion member LCM may convert the first light to the second light. The second light generated from the light conversion member may be transmitted through the open part OP and then supplied to the light guide plate 130. The second light may be white light. The second light may be guided upward by the light guide plate 130.

The second light that is guided upward by the light guide plate 130 may be spread out, concentrated, and supplied to the display panel 110. The second light may be light generated from the backlight unit BLU. The pixels of the display panel 110 may display an image using light supplied thereto from the back light unit BLU.

Figure 2:
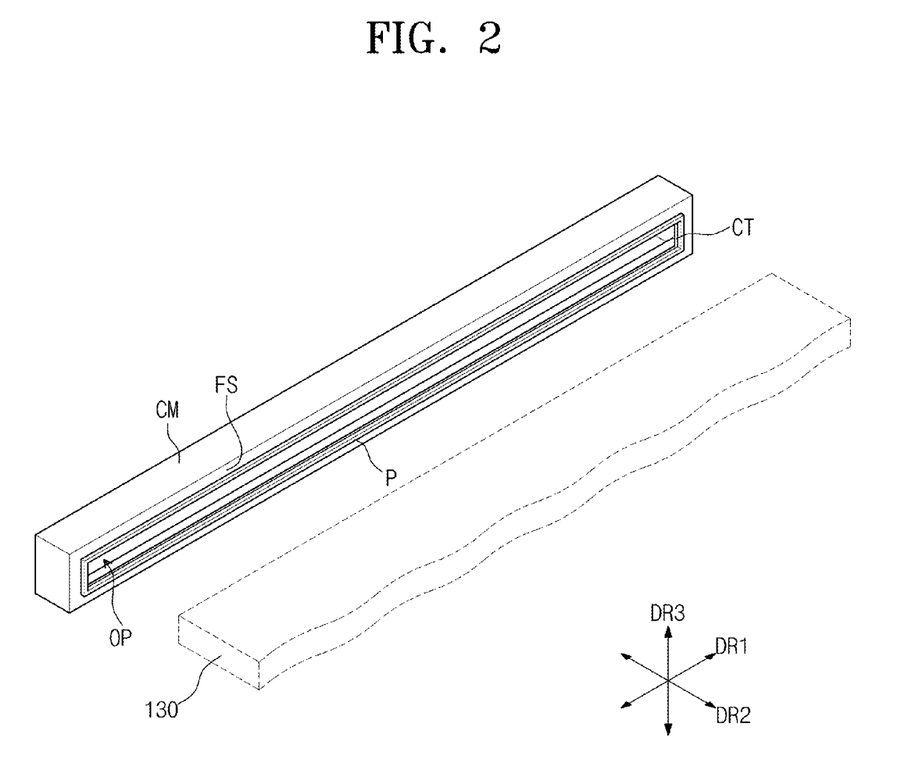
FIG. 2 is an enlarged view illustrating the case member shown in FIG. 1.

FIG. 2 is an enlarged view illustrating the case member shown in FIG. 1.

Referring to FIG. 2, the case member CM may include an open part OP disposed at a front side FS of the case member CM facing a side of the light guide plate 130, a protrusion part P protruding out from the front of the case member CM toward a side of the light guide plate 130, and a contact part CT, which is a portion of the front side FS that is disposed between the inner edge of the protrusion part P and the edge of the open part OP.

The contact part CT may be disposed between the protrusion part P and the open part OP in the first direction DR1, and between the protrusion part P and the open part OP in the third direction DR3.

The open part OP may be formed to penetrate the case member CM in the second direction DR2. The open part OP may extend along the first direction DR1. In detail, the open part OP may be shaped in a rectangle having long sides in the first direction DR1 and short sides in the third direction DR3.

The protrusion part P may be formed in a frame extending along the first direction DR1. In detail, the protrusion part P may be shaped in a rectangular frame having long sides in the first direction DR1 and short sides in the third direction DR3. Hereinafter, a side of the protrusion part P, which is facing toward the open part OP, may be defined as "an inner side", while the side opposite of the inner side of the protrusion part P may be defined as "an outer side".

On the first plane, the protrusion part P may be disposed to surround the open part OP. On the first plane, the frame of the protrusion part P may be larger than the open part OP. That is, the rectangular frame of the protrusion part P may be formed larger than the rectangle of the open part OP.

In particular, in the first direction DR1, the long side of the open part OP may be shorter than the inner side of the protrusion part P extending along the first direction DR1. In the third direction DR3, the short side of the open part OP may be shorter than the inner side of the protrusion part P extending along the third direction DR3.

The contact part CT may correspond to a part that is disposed between the protrusion part P and the open part OP, in the front side FS of the case member CM. That is, the contact part CT may be a part of the front side FS of the case member CM.

In the second direction DR2, a predetermined region of a side of the light guide plate 130 may be inserted into the frame of the protrusion part P. A region forming the inner side of the framed protrusion part P may be same size as a side of the light guide plate 130. This configuration in which the light guide plate 130 is inserted into the frame of the protrusion part P will be described in detail later with reference to FIG. 4.

Figure 3:
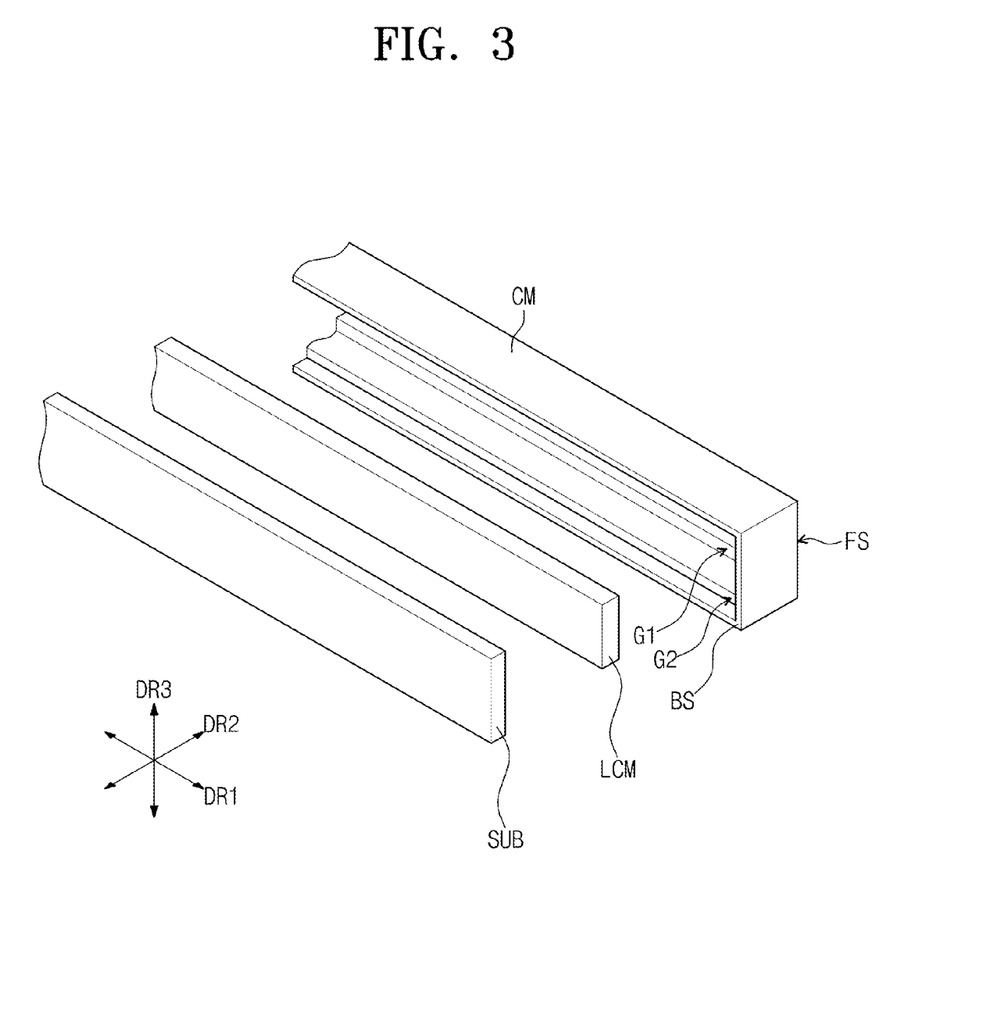
FIG. 3 illustrates the back of the case member shown in FIG. 1.

FIG. 3 illustrates the back of the case member shown in FIG. 1.

Referring to FIG. 3, the case member CM may include first and second grooves, G1 and G2, overlapping each other and having different sizes from each other. A back side BS is the side opposite of the front side FS in the case member CM. As can be seen more clearly in FIG. 4, the grooves G1 and G2 may be formed as cut-outs on the inside of the case member CM form a step structure from the back side BS to the front side FS.

The first and second grooves G1 and G2 may be formed so as to be inset with different depths from the back side BS of the case member CM toward the front side FS of the case member CM. The first and second grooves G1 and G2 may have long sides in the first direction DR1 and short sides in the third direction DR3.

In the second direction DR2, the first groove G1 may be disposed adjacent to the open part OP. In the second direction DR2, the second groove G2 may be disposed adjacent to the back side BS of the case member CM. That is, the first groove G1 is inset deeper than the second groove G2 in the second direction DR2 from the back side BS.

On the first plane, the first groove G1 may be smaller than the second groove G2 in size. That is, the long side (upper surface) of the first groove G1 may be shorter than that of the second groove G2 in the first direction DR1. And the short side of the first groove G1 may be shorter than that of the second groove G2 in the third direction DR3.

On the first plane, the first groove G1 may be smaller than the open part OP in size. That is, the long side of the first groove G1 may be shorter than that of the open part OP in the first direction DR1. And the short side of the first groove G1 may be shorter than that of the open part OP in the third direction DR3.

On the first plane, the first groove G1 may be sized the same as the light conversion member LCM so that the light conversion member LCM fits into the groove G1. On the first plane, the second groove G2 may be sized in the same with the substrate SUB of the light source LS, so that the substrate SUB fits into the second groove G2.

The light conversion member LCM may be disposed in the first groove G1. The light source LS may be disposed in the second groove G2. This configuration in which the light conversion member LCM and the light source LS are disposed in the first and second grooves G1 and G2 will be described in detail hereinafter in conjunction with FIG. 4.

Figure 4:
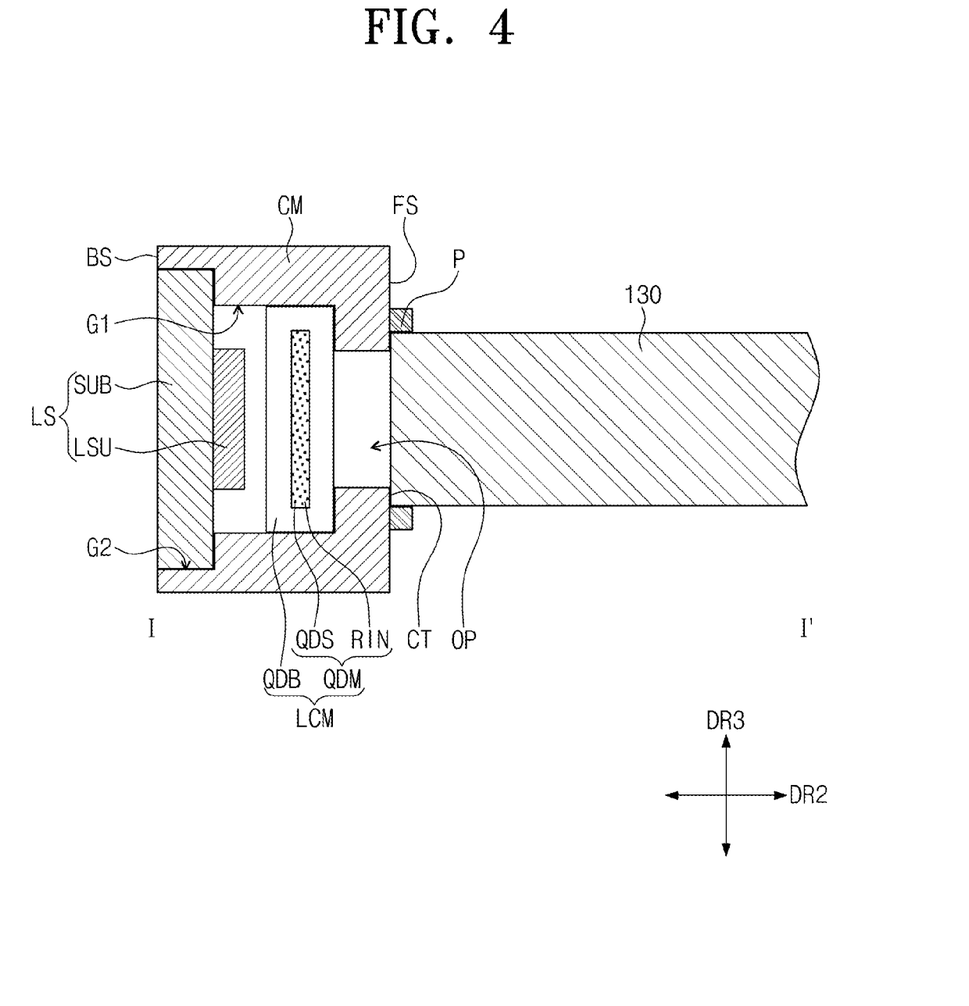
FIG. 4 is a sectional view taken by I-I' of FIG. 1, illustrating a combinational feature with a light source, a light conversion member, and a light guide plate in the case member.

FIG. 4 is a sectional view taken by I-I' of FIG. 1, illustrating the light source, the light conversion member, and the light guide plate combined with the case member.

In the second direction DR2, a depth of the first groove G1, which is defined as a gap of height between bottom levels of the first and second grooves G1 and G2, may be larger than a thickness of the light conversion member LCM.

In the second direction DR2, a depth of the second groove G2, which is defined as a gap of height between the bottom of the second groove G2 and the back side BS of the case member CM, may be the same as a thickness of the substrate SUB of the light source LS. However, the depth of the second groove G2 may be larger than a thickness of the substrate SUB of the light source LS in the second direction DR2.

The light conversion member LCM may be inserted into the first groove G1. As the thickness of the light conversion member LCM is smaller, in the second direction DR2, than the depth of the first groove G1, a space is formed between the bottom of the second groove G2 and the light conversion member LCM. Although not shown, the light conversion member LCM may be adhesively coupled with the bottom of the first groove G1 by means of an adhesive member.

The substrate SUB of the light source LS may be inserted into the second groove G2. A predetermined region at the boundary of the front of the substrate SUB, in which the light source units LSU are arranged, may be disposed to adhere to the bottom of the second groove G2. Accordingly, the light source units LSU may be disposed in a predetermined space of the first groove G1 between the bottom of the second groove G2 and the light conversion member LCM. Although not shown, the substrate SUB of the light source LS may be adhesively coupled with the bottom of the second groove G2 by means of an adhesive member.

Therefore, the light conversion member LCM and the light source LS may be coupled each other by the case member CM.

When the first light is being emitted from the light source units LSU, there is inevitably generated heat in the light source units LSU. If the heat emitted from the light source units LSU is transmitted directly to the light conversion member LCM in, for example, a structure in which the light source units LSU are in contact with the light conversion member LCM, there would be damage to quantum dot members QDM of the light conversion member LCM.

According to an embodiment, in the second direction DR2, the thickness of the first groove G1 may be designed larger than a sum of the thicknesses of the light conversion member LCM and each of the light source units LSU. Thus, if the light source LS is inserted into the second groove G2, the light source units LSU may be disposed not to contact with the light conversion member LCM.

In the second direction DR2, a predetermined region of a side of the light guide plate 130 may be inserted into the frame of the protrusion part P. In particular, a predetermined region at the boundary of a side of the light guide plate 130 may be disposed to meet the contact part CT in the second direction DR2. In the third direction DR3, a predetermined region of both sides adjacent to a side of the light guide plate 130 meeting the contact part CT may be disposed to contact with the inner side of the protrusion part P.

Although the both sides of the light guide plate 130 in the first direction DR1 are not shown in the section by I-I' of FIG. 1, a predetermined region of the both sides adjacent to a side of the light guide plate 130 meeting the contact part CT may be substantially disposed, in the first direction DR1, to contact with the inner side of the protrusion part P.

As aforementioned, the light source units LSU may emit the first light. The first light emitted from the light source units LSU may be supplied to the light conversion member LCM.

The light conversion member LCM may include a quantum dot bar QDB and a quantum dot member QDM accommodated in the quantum dot bar QDB. The quantum dot member QDM may include a resin RIN and quantum dots QDS accommodated in the resin RIN.

The quantum dot bar QDB may be formed in, for example, a glass. The quantum dot bar QDB may extend along the first direction DR1. The quantum dot bar QDB may have an inner space extending along the first direction DR1 and accommodating the quantum dot member QDM.

The quantum dot member QDM may convert the first light, which is supplied from the light source units LSU, into the second light. In other words, for example, the quantum dot member QDM may convert blue light, which is emitted from the light source units LSU, into white light.

The quantum dot member QDM may include quantum dots with different sizes, according to kinds of the light source units LSU, in order to generate white light. For instance, if the light source units LSU emit blue light, the quantum dot member QDM may include quantum dots QDS having a size for absorbing blue-wavelength light and emit green-wavelength light, and quantum dots QDS having a size for absorbing blue-wavelength light and emitting red-wavelength light.

The quantum dots QDS of the quantum dot member QDM may absorb blue light from the light source LS and then convert the blue light into green or red-wavelength light. The blue light may not be partly absorbed into the quantum dots QDS. For that reason, the blue, green and red-wavelength light may be mixed with each other to generate white light.

On the first plane, the quantum dot member QDM may be larger than or equal to the open part OP. In particular, the quantum dot member QDM may be longer than the open part OP in the first and third directions DR1 and DR3.

Although FIG. 4 shows that the quantum dot member QDM is larger than the open part Op as an example embodiment, the quantum dot member QDM may be identical to the open part OP in size on the first plane.

If the open part OP is larger than the quantum dot member QDM on the first plane, the first light may penetrate the quantum dot bar QDB, which is adjacent to both sides of the light conversion member LCM in the first and third directions DR1 and DR3, and then may be supplied to the light guide plate 130 through the open part OP. During this, the first light may be supplied to the light guide plate 130, without conversion into the second light. That is, there would be leakage of blue light.

In an embodiment, however, the case member CM may block light and the open part OP may be smaller than or equal to the quantum dot member QDM. Accordingly, the first light may be converted into the second light through the quantum dot member QDM and then supplied to the light guide plate 130 through the open part OP. Additionally, light supplied to the quantum dot bar QDB adjacent to both sides of the light conversion member LCM in the first and third directions DR1 and DR3 may be blocked by the case member CM and then not provided to the light guide plate 130. As a result, blue light as the first light may not be leaked out.

Consequently, the display apparatus 100 according to embodiments of the inventive concept it may, advantageously, be relatively easy to combine the light source LS with the light conversion member LCM and prevent blue light from leaking out.

Figure 5:
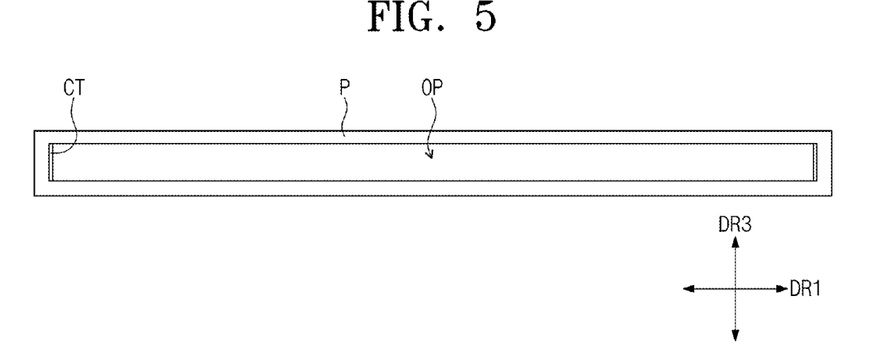
FIGS. 5, 6, and 7 illustrate various patterns of the light conversion member in other embodiments of the inventive concept.
Figure 6:
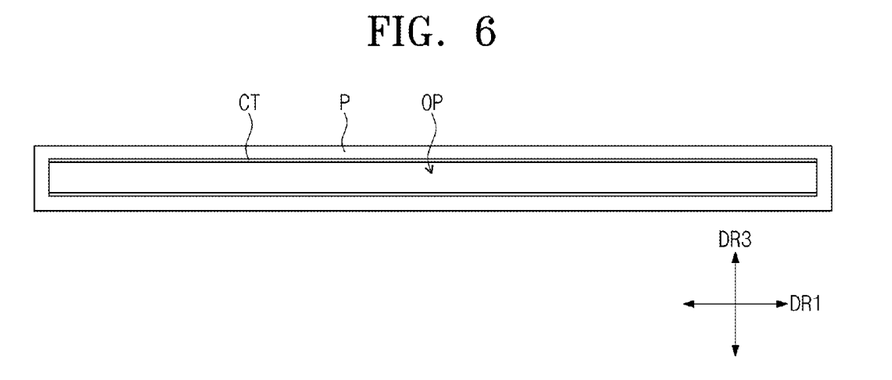
Figure 7:
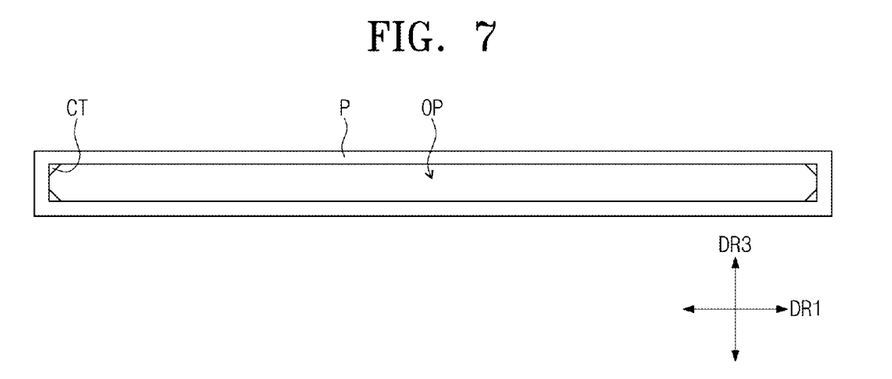

FIGS. 5 to 7 illustrate various patterns of the light conversion member in other embodiments of the inventive concept.

Case members CM shown in FIGS. 5 to 7 may be shaped the same as that shown in FIG. 1, substantially, but with various configurations of the contact parts CT and open parts OP. Hereinafter various configurations involved in the contact parts CT and the open parts OP will be described. In addition, for the sake of descriptive convenience, FIGS. 5 to 7 illustrate only protrusion parts P, the contact parts CT, and the open parts OP on a plane.

Referring first to FIGS. 5 and 6, the open part OP may be shaped in a rectangle having long sides in the first direction DR1 and short sides in the third direction DR3. The protrusion part P may be shaped in a rectangular frame having long sides in the first direction DR1 and short sides in the third direction DR3.

The rectangular frame of the protrusion part P may be formed larger than the rectangle of an open part OP. In detail, as shown in FIG. 5, the long side of the open part OP in the first direction DR1 may be shorter than an inner side of the protrusion part P extending along the first direction DR1. In the third direction DR3, the short side of the open part OP may be equal to an inner side of the protrusion part P, which extends along the third direction DR3, in length. Accordingly, the contact part CT may be disposed between the protrusion part P and the open part OP.

Additionally, as shown in FIG. 6, the long side of the open part OP in the first direction DR1 may be equal to the inner side of the protrusion part P, which extends along the first direction DR1, in length. The short side of the open part OP in the third direction DR3 may be longer than the inner side of the protrusion part P extending along the third direction DR3. Accordingly, the contact part CT may be disposed between the protrusion part P and the open part OP in the third direction DR3.

Referring to FIG. 7, the protrusion part P is the same as those of FIGS. 5 and 6. The open part OP may be shaped in an octagon. An interval between both sides of the open part OP, which face each other in the first direction DR1, may be equal to the inner side of the protrusion part P, which extends along the first direction DR1, in length. An interval between both sides of the open part OP, which face each other in the third direction DR3, may be equal to an inner side of the protrusion part P, which extends along the third direction DR3, in length.

The contact part CT is disposed between rectangular vertexes, which are formed by the inner sides of the protrusion part P, and four sides of the open part OP except that both of its sides face each other. In other words, the contact part CT may be disposed at each of the rectangular vertexes which are formed by the inner sides of the protrusion part P. Additionally, the contact part T may be shaped in a rectangular triangle having a rectangular side facing each rectangular vertex which is formed by the inner sides of the protrusion part P.

While the inventive concept has been described with reference to example embodiments, it will be apparent to those skilled in the art that various changes and modifications may be made without departing from the spirit and scope of the inventive concept set forth throughout the disclosure including the annexed claim matters. Therefore, it should be understood that the above embodiments are not limiting, but illustrative, hence all technical things within the annexed claims and the equivalents thereof may be construed as properly belonging to the territory of the inventive concept.

What is claimed is:

1. A display apparatus comprising:
 a display panel configured to display an image using light;
 a light source configured to generate first light;
 a light conversion member configured to convert the first light into the light;
 a case member configured to accommodate the light source and the light conversion member and including an open part to transmit the light which is converted by the light conversion member; and
 a light guide plate configured to receive the light through the open part and guide the light toward an upward direction where the display panel is disposed,
 wherein the light source, the light conversion member and the case member extend along a first direction, the light conversion member is disposed between the light source and the case member in a second direction intersecting the first direction, and the case member is disposed adjacent to a side of the light guide plate,
 wherein the case member further includes:
 a protrusion part protruding out to the side of the light guide plate at a front side of the case member facing the side of the light guide plate and having a shape of frame to surround the open part;
 a contact part, as a part of the front side of the case member, disposed between the protrusion part and the open part; and
 a first groove and a second groove overlapping each other and having different sizes from each other, the second groove is inset from the first groove toward the front side of the case member from a back side which is the opposite of the front side in the case member,
 wherein the first groove is disposed adjacent to the open part, the second groove is disposed adjacent to the back side of the case member, the first groove is smaller than the second groove on a first plane formed in a third direction intersecting the first and the second directions, and the open part is smaller than the first groove.

2. The display apparatus according to claim 1, wherein the case member blocks light.

3. The display apparatus according to claim 1, wherein the first light is blue and the light is white.

4. The display apparatus according to claim 1, wherein the light conversion member is larger than the open part and overlaps with the open part.

5. The display apparatus according to claim 1, wherein the light conversion member is inserted into the first groove and the light source is inserted into the second groove.

6. The display apparatus according to claim 1, wherein a predetermined region of the side of the light guide plate is inserted into the frame of the protrusion part.

7. The display apparatus according to claim 1, wherein the light conversion member includes:
   a quantum dot member configured to convert the first light into the light; and
   a quantum dot bar configured to accommodate the quantum dot member,
   wherein an area of the quantum dot member facing the open part is larger than or equal to an area of the open part on the first plane.

8. The display apparatus according to claim 1, wherein the first groove is equal to the light conversion member in size on the first plane.

9. The display apparatus according to claim 8, wherein a depth of the first groove, which is defined as a gap of height between bottoms of the first and second grooves in the second direction, is larger than a thickness of the light conversion member in the second direction.

10. The display apparatus according to claim 1, wherein the light source includes:
    a substrate extending along the first direction; and
    a plurality of light source units arranged with a uniform interval in the first direction on the substrate and generating the first light.

11. The display apparatus according to claim 10, wherein the second groove is equal to the substrate of the light source in size on the first plane.

12. The display apparatus according to claim 11, wherein a depth of the second groove, which is defined as a gap of height between a bottom of the second groove and the back side of the case member in the second direction, is larger than or equal to a thickness of the substrate of the light source in the second direction.

13. The display apparatus according to claim 10, wherein a depth of the first groove, which is defined as a gap of height between bottoms of the first and second grooves in the second direction, is larger than a sum of thicknesses of the light conversion member and each of the light source units in the second direction.

14. The display apparatus according to claim 1, wherein a region formed by inner sides of the framed protrusion part is equal to a side of the light guide plate in size on the first plane.

15. The display apparatus according to claim 1, wherein the frame of the protrusion is larger than the open part on the first plane and the contact part is disposed between the protrusion part and the open part in the first and third directions.

16. The display apparatus according to claim 1, wherein the contact part is disposed between the protrusion part and the open part in the first direction.

17. The display apparatus according to claim 1, wherein the contact part is disposed between the protrusion part and the open part in the third direction.

18. The display apparatus according to claim 1, wherein the protrusion part is shaped in a rectangular frame having long sides in the first direction and short sides in the third direction, and the contact part is disposed at each rectangular vertex formed by inner sides of the protrusion part.

* * * * *